July 14, 1931.   A. L. GENTER   1,814,377
GAS SCRUBBING DEVICE
Filed Aug. 23, 1927
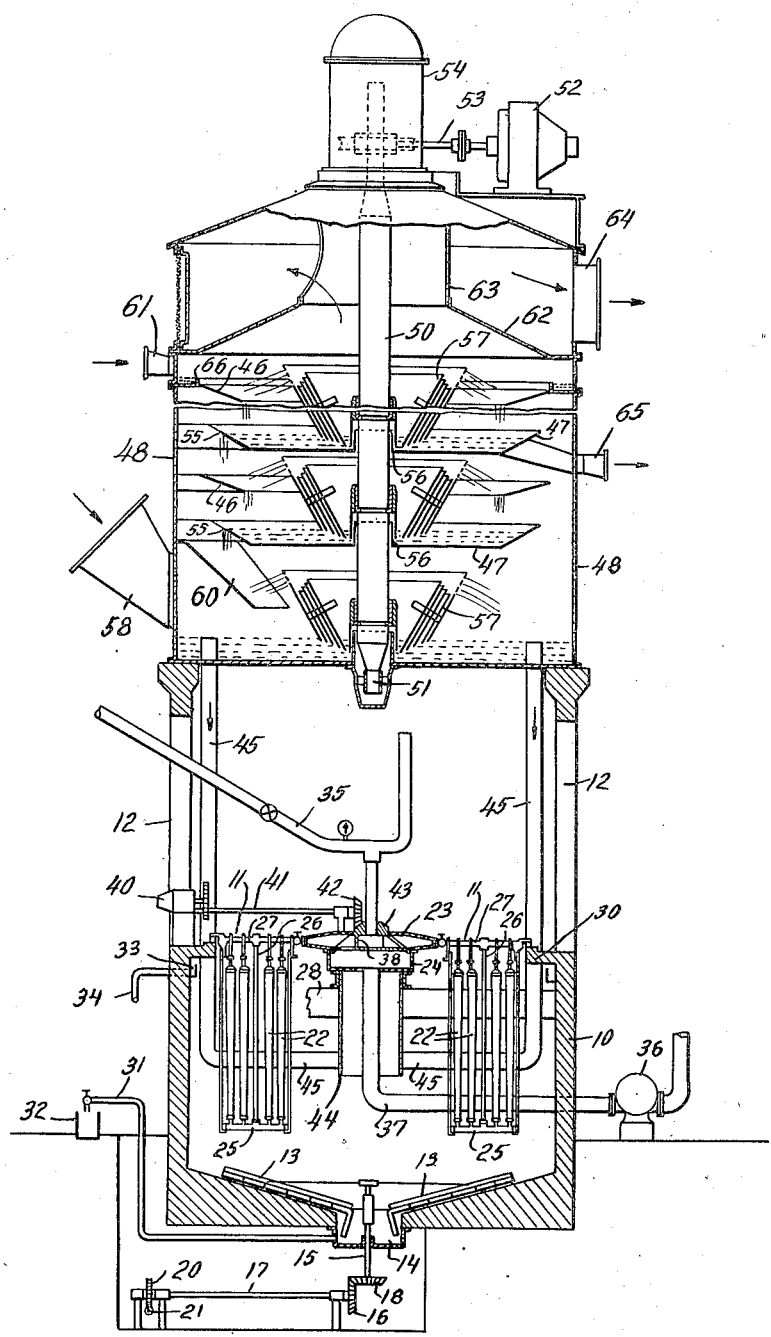
INVENTOR
Albert L. Genter
BY
Pennie, Davis, Marvin & Edmonds
ATTORNEYS Patented July 14, 1931

1,814,377

UNITED STATES PATENT OFFICE

ALBERT L. GENTER, OF SALT LAKE CITY, UTAH, ASSIGNOR TO GENTER THICKENER CO., OF SALT LAKE CITY, UTAH, A CORPORATION OF DELAWARE

GAS SCRUBBING DEVICE

Application filed August 23, 1927. Serial No. 214,817.

This invention relates to gas scrubbing devices and has for its object the provision of a novel device by means of which particulate matter entrained in gases may be removed therefrom by means of a liquid and subsequently separated from the liquid in a thoroughly efficient and practical manner. More particularly, the invention aims to provide a combined gas scrubbing and liquid separating apparatus in which heat transferred to the liquid during the scrubbing operation may be advantageously utilized to promote rapid and efficient separation of the cleaning liquid and the particulate matter.

It is common practice to remove dust from gases by scrubbing or washing the gases with water. This is usually accomplished by passing the gases upwardly through a suitable tower in contact with a descending flow of water. The towers are usually so constructed that tortuous paths for the streams of water and gases are provided. According to some present practices the water is permitted to flow through the tower in thin films in contact with the packing material contained therein, the necessary intimate contact of the gases with the water being achieved through the turbulency of the gases in their upward passage. In some instances, the towers are so constructed that the water in its downward passage is caused to flow in sheets across the path of travel of the gases. In other instances, the towers are provided with mechanical devices which cause a spraying or atomizing of the water in the paths of travel of the gases.

The water is withdrawn from the towers adjacent the points of entry of the gases, and, in some instances, it is conducted to suitable decantation apparatus or settling basins for the purpose of separating the water from the entrained particulate matter. The separating devices are usually located at some distance from the scrubbing apparatus and require relatively large areas for their installation. In plants where the necessary space for settling ponds, decantation tanks, or filters is not available, the wash water from the scrubbers is wasted. This practice generally results in stream pollution, and, in some plants, as for instance, steel plants, a loss of valuable solid substances. In some instances, the gases contain valuable substances which may be recovered, but it is found that the cost of installing and operating the usual separating devices is so great as to make their recovery uneconomical. In these latter instances, where it is permissible, the wash waters are wasted, and, where laws against stream pollution are in force, the entrained solid substances are separated from the wash water at a loss.

The present invention is based on the utilization of the heat transferred from the gases to the wash water during the scrubbing operations to promote separation of the water and solid substances. High temperatures are most conducive to the separation of solids from liquids in which they are suspended, since the viscosity of a liquid decreases as the temperature increases while the solids remain substantially unaffected. By preventing dissipation of the heat contained in the wash water between the scrubbing and separating steps in a process for recovering entrained particulate matter from gases, I am able to effect a substantially complete recovery of the entrained material in a shorter time and at a lower cost than has been heretofore possible.

In carrying out my invention, I combine a gas scrubbing device and a liquid separating device to form a single unitary structure. The liquid separating portion of my apparatus forms the substructure for the gas scrubbing portion of the apparatus. The hot wash water flows downwardly within the apparatus directly to the liquid separator without any substantial loss of heat. The efficiency of the apparatus is such that the liquid separator may be of substantially the same cross-sectional area as the scrubber or of substantially the same cross-sectional area as the substructure of the usual gas scrubbing device. Thus, I have provided an apparatus which combines the functions of and operates more efficiently than the separate gas scrubbers and liquid separators in common use while requiring no more ground space than the usual gas scrubber alone. In combining the two separate devices I have not only provided an apparatus which functions to produce results which cannot be achieved by the two devices heretofore commonly used, but I have provided an apparatus which may be installed and operated at a cost which is relatively low as compared with the cost of installing and operating two separate devices.

The foregoing and other novel features of my invention will be better understood from the following description, taken in conjunction with the accompanying drawing, in which the single figure shown is a vertical section taken substantially through the center of the apparatus, part of the scrubbing device being broken away in order that the apparatus may be shown on a relatively large scale.

In the embodiment shown in the drawing, a well known type of vertical gas scrubber is mounted above a dewatering device of the type illustrated in the United States Patents 1,359,162, 1,379,495, and 1,560,796 and my co-pending applications, Serial No. 43,957, patented Sept. 20, 1927, No. 1,642,673; Serial No. 61,676, patented Nov. 12, 1929, No. 1,734,999; and Serial No. 62,721, patented June 4, 1929, No. 1,716,040, to form a substantially vertical tower. The dewatering device, which forms the substructure for the scrubber, comprises a tank 10, which is preferably formed of concrete, having a plurality of filter units 11 mounted therein. The tank wall extends above the filter units to form a support for the scrubber, and it is provided with a number of openings 12 through which access to the entire dewatering device may be obtained.

Rakes 13 which are adapted to move the sediment deposit on the inclined bottom of the tank toward the centrally disposed sump 14 are mounted within the tank on a vertical shaft 15. The teeth of the bevelled gear 16 mounted on an end portion of the horizontal shaft 17 mesh with the teeth of the bevelled gear 18 which is mounted on the lower end portion of the vertical shaft 15. The shaft 17 is rotated through the agency of a worm wheel 20 rigidly mounted thereon and a worm 21 which is connected to a suitable source of power (not shown).

The filter units 11, each of which comprises a plurality of tubular filter elements 22, which comprise bodies of perforated metal or corrugated wood having outer coverings of porous material, are grouped around a centrally disposed automatic valve body 23 and filtrate receiver 24. The filter elements 22 are closed at the top and connected at their bottom ends to pipes 25 which are in turn connected to the valve body 23 through pipes or conduits 26 and 27. The valve body 23 and filtrate receiver 24 are supported on one or more beams or girders 28 which may extend across the tank 10. The filter units 11 are removably supported by the valve body 23 and an annular ledge 30 formed on the interior of the tank 10. The pipe 31 which is connected to the sump 14 forms an outlet through which the contents of the bottom of the tank may be discharged to a launder 32. An overflow launder 33 and an outlet pipe 34 are provided on the interior of the tank 10 adjacent the tops of the filter units.

The valve body 23 is connected to a suitable pressure pump not shown through a pipe 35 and to a vacuum pump 36 through the receiver 24 and a pipe 37. A valve plug 38 which is so constructed as to be adapted to alternately connect each of the filter units 11 with the pressure line 35 and the vacuum line 37 is rotated by a motor 40 acting through the horizontal shaft 41 and the bevelled gears 42 and 43 in the manner described in my co-pending application, Serial No. 62,721, filed October 16, 1925. A seal 44 which depends from the receiver 24 communicates with the pipes 45 which are provided for the purpose of conducting the wash water from the scrubber to the tank 10.

The scrubber is divided into a plurality of communicating compartments or chambers by a series of annular baffles 46 and a series of annular trays 47 which are rigidly mounted on the interior of the tubular shell 48. A centrally disposed vertical shaft 50 is rotatably mounted within the shell 48 on a bearing 51 mounted on the bottom wall of the scrubber. The shaft 50 is supported at the top by a suitable bearing and connected to the driving motor 52 by the shaft 53 and other suitable means contained within the housing 54. Each of the trays 47 is provided with inner and outer walls 55 and 56, the outer wall 55 constituting overflow lip and being lower than the inner wall 56.

Spraying units 57, each of which comprises an outer inverted frusto-conical shell having a perforated upper edge portion and a plurality of inner imperforate inverted frusto-conical shells of graduated sizes, are rigidly mounted on the shaft 50 intermediate adjacent trays 47, above the uppermost tray 47 and below the lowermost tray 47. The spraying units 57 are so mounted on the shaft 50 that the lower ends of the frusto-conical members comprising the lowermost unit extend below the upper ends of the pipes or conduits 45 and the lower ends of the frusto-conical members of each of the other units extend below the overflow lip of the tray 47 which is positioned immediately below the unit. The scrubber is provided with a gas inlet 58 adjacent its lower end and a protecting baffle 60 is disposed between the gas inlet and the lowermost spraying unit. A water inlet 61 which communicates with an annular channel 66 is provided above the uppermost annular baffle 46. A frusto-conical shell 62 is mounted within the scrubber above the uppermost spraying unit and communicates with a cylindrical shell 63, having an opening in its wall through which the gases may pass. A gas outlet 64 is provided in shell 48 adjacent the top of the apparatus. One or more water outlets 65 may be connected to the intermediate trays of the scrubber.

In the operation of the apparatus, the shaft 50 carrying the spraying units 57 is continuously rotated at a high rate of speed. Water enters the channel 66 and overflows to the uppermost baffle 46 which guides it to the uppermost tray 47. The water flows downwardly through the scrubber continuously from each tray to the next lower baffle 46 and tray until it reaches the bottom from where it is conducted by the pipes or conduits 45 to the liquid separator below. The cones of the spraying devices dip into a constant supply of water and as they rotate with the shaft 50, the water is drawn upwardly on their inner surfaces and projected horizontally through the perforations of the outermost cones to form a fine mist or fog. The gas which enters through the inlet 58 passes upwardly through the water flowing over the edges of the baffles 46 and the fine mist formed by the spraying devices and out through the opening in the cylindrical member 63 and outlet 64. During the passage of hot gases through the scrubber, the water functions to condense metallic vapors or the vapors of any other high melting point substance and to remove the entrained dust which it carries to the bottom of the scrubber. The water from the uppermost chambers may be sufficiently clean and cool for re-use and a portion of it may be returned through the outlet 65 to the system.

The water collected on the bottom of the scrubber flows through the conduits 45 to the central seal 44 which is submerged in the contents of the tank 10. Since the distance from the bottom of the scrubber to the tank 10 is relatively short and the conduits 45 are contained entirely within the apparatus, little or no heat is lost during the transfer and the water enters the tank 10 at substantially the same temperature at which it leaves the scrubber.

Reduced pressure is continuously maintained in the receiver 24 by the vacuum pump 36, and the valve plug 38 is rotated to alternately connect the filter units with the receiver and the pressure line 35 for predetermined periods. While each filter unit is in connection with the receiver water is drawn through the porous coverings of the filter elements of the unit and cakes of the suspended solid matter material may form on the outer surfaces of the filter elements. When the filter units are cut off from the receiver and pressure is applied, the cakes are caused to fall away from the filter elements and they settle to the bottom of the tank to form a sludge which is moved to the sump 14 by the rakes 13 and which may be withdrawn through the outlet pipe 31. Clear water may pass to the overflow launder 33 and out through the outlet pipe 34.

If the amount of water flowing to the tank 10 is relatively small and the water is hot enough to reduce the viscosity sufficiently, the filtering apparatus may be dispensed with and a clear overflow to the launder 33 and a satisfactory sludge may be obtained by simple decantation methods alone.

Sufficient filter area, either of the sand bed type or the type illustrated, may be combined with the available decantation area in any installation to adequately handle the maximum amount of water which it will be desirable to use in the scrubber. Decantation may also be materially aided by the addition of suitable flocculating agents to the contents of the tank 10.

I claim:

1. An apparatus for recovering entrained particulate matter from gases, which comprises a scrubber, means having an unobstructed passage for introducing particle-laden gases into the scrubber, means for bringing a liquid into intimate contact with the gases to remove the particulate matter from said gases, a receptacle for receiving the liquid containing the particulate matter, and filter means for separating said particulate matter and said liquid.

2. An apparatus for recovering entrained particulate matter from gases, which comprises a scrubber, means having an unobstructed passage for introducing particle-laden gases into the scrubber, means for bringing a liquid into intimate contact with the gases to remove the particulate matter from said gases, a tank having a bottom discharge outlet, means for conducting liquid from said scrubber to said tank, and one or more filter elements extending into said tank and adapted to separate said liquid from said particulate matter.

3. An apparatus for recovering entrained particulate matter from gases, which comprises a scrubber, means having an unobstructed passage for introducing particle-laden gases into the scrubber, means for bringing a liquid into intimate contact with the gases to remove the particulate matter from said gases, a tank provided with a substantially centrally disposed discharge outlet in its bottom wall, filter means extending into said tank and adapted to separate said liquid from said particulate matter, and a rake for moving solids deposited upon the bottom of said tank toward said discharge outlet.

4. An apparatus for recovering particulate matter from gases, which comprises a tank provided with a substantially centrally disposed discharge outlet in its bottom wall and having an overflow launder adjacent its upper edge, a gas scrubbing device mounted upon said tank, means having an unobstructed passage for introducing particle-laden gases into said scrubbing device, means for bringing a liquid into intimate contact with the gases to remove the particulate matter from said gases, means for conducting liquid from said gas scrubbing device to said tank, and a rake mounted within said tank and adapted to move solids settling upon the bottom of said tank toward said discharge outlet.

5. An apparatus for recovering particulate matter from gases, which comprises a tank having a bottom discharge outlet, a scrubbing device mounted upon said tank, means having an unobstructed passage for introducing particle-laden gases into said scrubbing device, means for bringing a liquid into intimate contact with the gases to remove the particulate matter from said gases, means for conducting liquid from said scrubbing device to said tank, and filter means extending into said tank and adapted to separate said liquid from said particulate matter.

6. An apparatus for recovering particulate matter from gases, which comprises a tank provided with a substantially centrally disposed discharge outlet in its bottom wall, a gas scrubbing device mounted upon said tank, means having an unobstructed passage for introducing particle-laden gases into said scrubbing device, means for bringing a liquid into intimate contact with the gases to remove the particulate matter from said gases, means for conducting liquid from said scrubbing device to said tank, filter means extending into said tank and adapted to separate said liquid from said particulate matter, and a rake mounted within said tank and adapted to move solids deposited upon the bottom of said tank toward said discharge outlet.

7. Apparatus for recovering particulate matter from gases which comprises a vertically disposed tank having a bottom discharge outlet, a scrubbing device mounted upon said tank, means having an unobstructed passage communicating with said scrubbing device at a point near its bottom for introducing particle-laden gases into said scrubbing device, means for bringing liquid into intimate contact with the gases to remove the particulate matter from said gases, means for conducting liquid from said scrubbing device to said tank, a plurality of filter elements extending into said tank and adapted to separate said liquid from said particulate matter, and means for mechanically removing the solids deposited on the bottom of said tank.

8. Apparatus for recovering particulate matter from gases which comprises a tank provided with a substantially centrally disposed discharge outlet in its bottom wall, a gas scrubbing device mounted upon said tank and provided with means for bringing a liquid into intimate contact with the gases to remove the particulate matter from said gases, means for conducting liquid from said scrubbing device to said tank, a plurality of filter elements extending into said tank and adapted to separate said liquid from said particulate matter, and a rake mounted within said tank and adapted to remove solids deposited on the bottom of said tank toward said discharge outlet.

In testimony whereof I affix my signature.

ALBERT L. GENTER.